(12) United States Patent
Matsuno et al.

(10) Patent No.: US 6,393,819 B1
(45) Date of Patent: May 28, 2002

(54) ROCKER PIN AND WIRE STOCK FOR PRODUCING THE SAME

(75) Inventors: Kazumasa Matsuno; Shigekazu Fukuda; Takayuki Funamoto; Yoshinori Iwasaki; Hiroshi Horie; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 47 days.

(21) Appl. No.: 09/689,485

(22) Filed: Oct. 12, 2000

(30) Foreign Application Priority Data

Oct. 12, 1999 (JP) .............................. 11-289886

(51) Int. Cl.[7] .......................... F16G 13/04; F16G 13/06
(52) U.S. Cl. .............................. 59/35.1; 59/93; 59/901; 474/215; 474/216
(58) Field of Search ............................ 59/4, 18, 23, 24, 59/29, 35.1, 901, 93; 474/215, 216, 217

(56) References Cited

U.S. PATENT DOCUMENTS

| | | | |
|---|---|---|---|
| 12,912 A | * 5/1855 | Morse | 474/216 |
| 2,725,755 A | * 12/1955 | Riopelle et al. | 474/215 |
| 3,353,421 A | * 11/1967 | Ketterle et al. | 474/215 |
| 4,130,026 A | * 12/1978 | Jeffrey | 474/215 |
| 4,507,106 A | * 3/1985 | Cole, Jr. | 474/215 |
| 4,764,158 A | * 8/1988 | Honda et al. | 474/215 |
| 4,986,798 A | * 1/1991 | Van Rooij et al. | 474/216 |

* cited by examiner

*Primary Examiner*—David Jones
(74) *Attorney, Agent, or Firm*—Howson & Howson

(57) ABSTRACT

A rocker pin for use in a power transmission chain has an identifying mark for distinguishing the rocker pin from another rocker pin having a different thickness or a different rocker surface. The identifying mark may include a groove, ridge, colored mark, lustrous streak or the like provided on a peripheral surface except a rocker surface in the longitudinal direction of the rocker pin. The rocker pin having such identifying mark can be visually identified with ease so that the rocker pin is prevented from being mixed with a different kind of rocker pins. This enables easy and confusion-free storage of the rocker pin and prevents incorrect combination of a longer pin and a shorter pin, which may occur when they are used in combination to form a single rocker joint.

34 Claims, 5 Drawing Sheets

ROCKER PIN AND WIRE STOCK FOR PRODUCING THE SAME

BACKGROUND OF THE INVENTION

1. Field of the Invention

The present invention relates to a rocker pin for use in rocker joints for connecting link plates of a power transmission chain and also to a wire stock for producing the rocker pin.

2. Description of the Related Art

In general, a conventional rocker joint used for connecting link plates of a power transmission chain is formed by a pair of rocker pins 1, 2 of different lengths arranged face to face in a manner as shown in FIG. 9. FIG. 10 is an end elevation of FIG. 9, which shows the longer pin 1 and the shorter pin 2 are identical in cross section and have the same thickness T.

In one silent chain proposed by the present assignee, link plates are connected together by rocker pins with non-uniform pitches. To provide such non-uniform link plate pitches, rocker pins having different thicknesses are used in combination. This arrangement requires producing and storing at least two kinds of rocker pins of different thicknesses and a like number of wire stocks of different thickness used for the production of the rocker pins.

In another silent chain, more than two kinds of rocker pins having rocker surfaces of different profiles are used in combination. In this case, it is likewise required to produce and store more than two kinds of rocker pins with different rocker surface profiles and a like number of wire stocks with different prospective rocker surface profiles for producing the rocker pins. However, each of the conventional rocker pins or the wire stocks does not have any means for distinguishing itself from another rocker pin or wire stock having a different thickness or a different rocker surface profile.

Consequently, the conventional rocker pins and wire stocks used for producing the same have the following problems:

(1) Due to the similarity in shape and configuration, the conventional rocker pins or wire stocks are not easy to distinguish from one another, requiring great care to avoid confusion when they are to be handled for storage, transportation and assembly.

(2) If two or more kinds of rocker pins of different thicknesses or different rocker surface profiles are inadvertently mixed together, sorting of the mixed rocker pins would be practically impossible because it would require measurement of individual rocker pins. For mass-produced chains, tens of thousands of rocker pins are handled as a single batch. It is, therefore, substantially impossible to measure the rocker pins one by one to sort out them. The mixed rocker pins are finally disposed as waste.

(3) If the longer pin and the shorter pin are incorrectly combined in any of the rocker joints of a silent chain, the silent chain is unable to achieve its prescribed function because an appropriate clearance is not provided between a pin-accommodating hole in the link plate and the rocker pins. Further, if the outside diameter of the rocker pins used in combination is larger than the diameter of the pin-accommodating hole of the link plate, the rocker pins cannot be inserted into the pin-accommodating hole, causing a damage to the machine used for assembling the silent chain.

SUMMARY OF THE INVENTION

It is an object of the present invention to provide a rocker pin which can be easily and visually distinguished by human eyes from another rocker pin having a different thickness or a different rocker surface.

It is another object of the present invention to provide a wire stock for producing rocker pins, which stock can be easily distinguished by human eyes from another wire stock used for producing rocker pins of a different thickness or a different rocker surface.

According to a first aspect of the present invention, there is provided a rocker pin having a given thickness and a peripheral surface including a convexly arcuate rocker surface, and further having an identifying means for distinguishing the rocker pin from another rocker pin having a different thickness or a different rocker surface.

In one preferred embodiment, the identifying means is provided on the peripheral surface except the rocker surface. The identifying means may include at least one groove, ridge, colored mark or streak having a different luster from that of the other surface, extending in the longitudinal direction of the rocker pin. The identifying means preferably extends from end to end along the full length of the rocker pin.

In another preferred embodiment, the identifying means is provided on at least one end face of the rocker pin. The end face preferably comprises an arcuate surface, an angled or V-shaped surface, or a like surface other than a surface extending perpendicularly to the longitudinal axis of the rocker pin. It is preferable that when identifying means is provided on both end faces of the rocker pin, the shape of one end face is complementary in contour to the shape of the other end face.

In yet another preferred embodiment, the peripheral surface further includes a back surface opposite to the rocker surface and a pair of side surfaces connecting the rocker surface and the back surface, and the identifying means comprises a beveled surface formed at an edge that is formed by the rocker surface and one of the side surfaces.

According to a second aspect of the present invention, there is provided a continuous wire stock to be severed into rocker pins of a predetermined length, which wire stock has a given thickness and a peripheral surface including a convexly arcuate prospective rocker surface, and further has an identifying means for distinguishing the wire stock from another wire blank having a different thickness or a different prospective rocker surface.

The identifying means preferably comprises least one groove, ridge, colored mark or streak having a different luster from that of the other surface. The identifying means is provided on the peripheral surface other than the prospective rocker surface and a part of extends in the longitudinal direction of the wire stock. The identifying means preferably extends along the full length of the wire stock. Instead, the identifying means can be formed by and end surface other than a surface perpendicular to the axis in the longitudinal axis of the wire stock, for example, a curved surface or a sloped surface.

By thus provided identifying means, it is easy to identify visually at least two kinds of rocker pins or wire stocks having different thicknesses or different rocker surfaces. Further, this fact makes it possible to prevent the mixture of different kinds of rocker pins or wire stocks and to prevent incorrect combination of a longer pin and a shorter pin constituting a rocker joint.

The above and other objects, features and advantages of the present invention will becomes apparent to these versed in the art upon making reference to the following detailed description and accompanying sheets of drawings in which certain preferred structural embodiments incorporating the principle of the present invention are shown by way of illustrative examples.

DESCRIPTION OF THE PREFERRED EMBODIMENTS

Figure 1A:
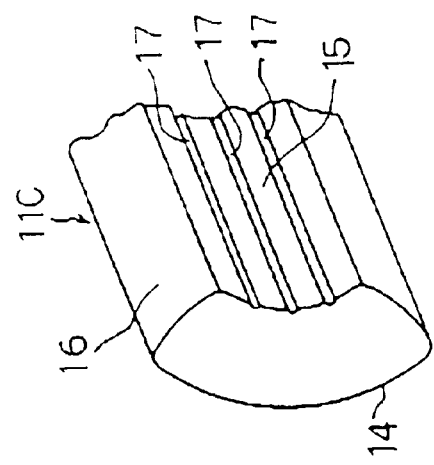
FIGS. 1A to 1E are fragmentary perspective views showing variants of a rocker pin according to a first embodiment of the present invention.
Figure 1B:
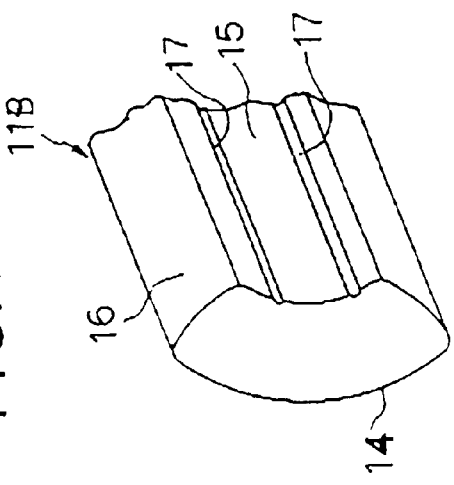
Figure 1C:
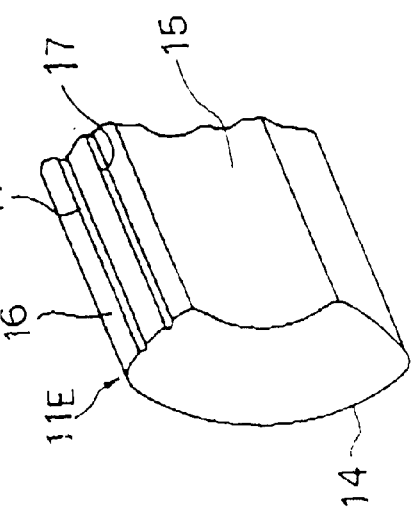
Figure 1D:
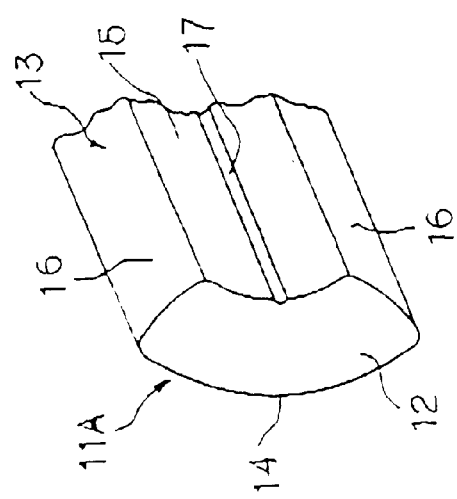
Figure 1E:
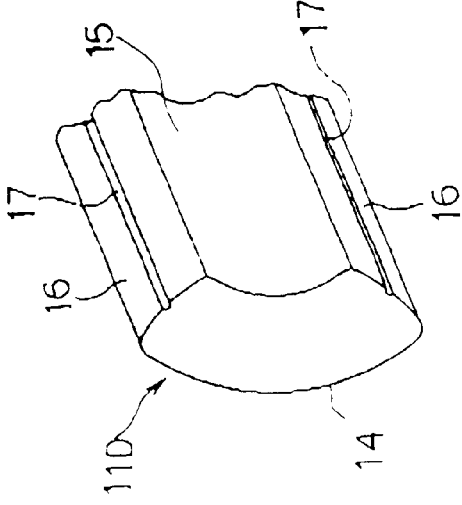

Certain preferred structural embodiments of the present invention will be described in greater detail with reference to the accompanying drawings in which like or corresponding parts are designated by the same reference characters throughout the several views.

Referring to the drawings and FIGS. 1A to 1E in particular, there are shown variants of a rocker pin according to a first embodiment of the present invention. The rocker pins 11A to 11E each have a pair of end faces 12 in the longitudinal direction (only one end is shown) and a peripheral surface 13 extending between the end faces. The peripheral surface 13 comprises a rocker surface 14 formed by a convexly arcuate surface, a back surface 15 formed by a concavely arcuate surface opposite to the rocker surface 14, and a pair of side surfaces 16, 16 formed by convexly arcuate surfaces connecting both ends of the rocker surface 14 in the circumferential direction and both ends of the back surface 15 in the circumferential direction. Each of the pins 11A–11E has an identifying means 17 on its peripheral surface 13 for distinguishing it from another rocker pin (not shown) having a different thickness or a different rocker surface.

The identifying means 17 of the rocker pin 11A shown in FIG. 1A comprises a groove formed in the back surface 15 and extending in the longitudinal direction of the rocker pin 11A. The identifying means 17 of the rocker pin 11B shown in FIG. 1B takes the form of two parallel grooves formed in the back surface 15 and extending in the longitudinal direction of the rocker pin 11E. The identifying means 17 of the rocker pin 11C shown in FIG. 1C comprises three parallel spaced grooves formed in the back surface 15 and extending in the longitudinal direction of the rocker pin 11C. Similarly, the identifying means 17 of the rocker pin 11D shown in FIG. 1D comprises a groove formed in each of the side surfaces 16 and extending in the longitudinal direction of the rocker pin 11D. The identifying means 17 of the rocker pin 11E shown in FIG. 1E consists of two parallel grooves formed in one of the side surfaces 16 and extending in the longitudinal direction of the rocker pin 11E.

In the embodiment shown in FIGS. 1A to 1E, it is preferred to form the grooves 17 along the full length of the rocker pins 11A to 11E. Additionally, it is preferable that the grooves 17 be formed in surfaces other than the rocker surface 14 of each rocker pin 11A–11E, that is, in the back surface 15 or the side surfaces 16. Though not shown, the grooves 17 can be formed on both the back surface 15 and the side surfaces 16. The groove 17 is preferably not more than 0.1 mm in width and not more than 0.1 mm in depth. When the rocker pins 11A to 11E are incorporated into power transmission chains, the rocker surfaces 14 are in rolling contact with the rocker surfaces of their respective companion rocker pins. Therefore it is preferable not to form the grooves (identifying means) 17 in the rocker surfaces 14.

According to the first embodiment, the number of the groove(s) 17 can be visually identified with ease. Accordingly, depending on the number of the groove 17, more than two kinds of rocker pins with different thicknesses or different rocker surfaces can be easily identified through visual inspection. This enables confusion-free storage of the rocker pins, prevents the rocker pins of one kind from being mixed with rocker pins of a different kind, and further prevents wrong combination of a longer pin and a shorter pin which may occur when they are used to form a single rocker joint.

Figure 2A:
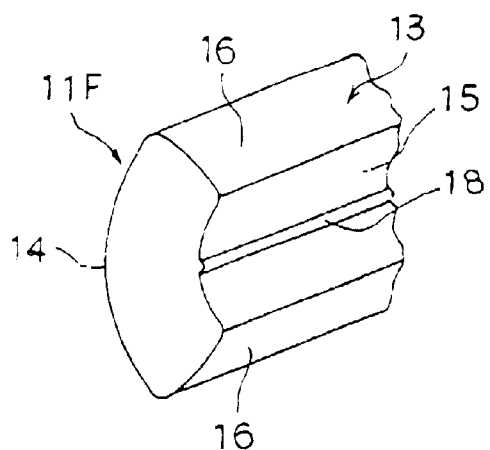
FIGS. 2A and 2B are fragmentary perspective views showing variants of a rocker pin according to a second embodiment of the present invention.
Figure 2B:
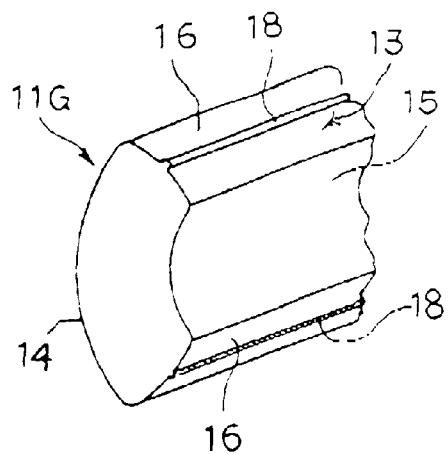

The groove 17 in the first embodiment may be replaced with a ridge 18 formed on a part of the peripheral surface of a rocker pin, such as shown in FIGS. 2A and 2B, provided that the peripheral surface part defines a clearance between itself and a peripheral wall forming a pin-accommodating hole of a link plate. FIGS. 2A and 2B correspond to FIGS. 1A and 1D, respectively. In FIG. 2A, the ridge 18 is formed on the back surface 15 of the rocker pin 11F. In FIG. 2B, the ridge 18 is provided on each of the side surfaces 16 of the rocker pin 11G. The ridges 18 are, as in the case of the grooves 17 in the first embodiment, preferably provided on surfaces other than the respective rocker surfaces 14 of the rocker pins 11F and 11G, that is, on the back surface 15 or the side surfaces 16, along the full length of the rocker pins. Though not shown, the ridges 18 can be formed on both the back surface 15 and the side surface(s) 16. The ridge 18 is preferably not more than 0.1 mm in width and not more than 0.1 mm in height.

The effects achieved by the identifying means composed of the ridge(s) 18 are the same as those of the identifying means composed of the groove(s) 17, and a further description thereof can, therefore, be omitted.

Each of the rocker pins 11A to 11G is produced a continuous wire stock having a cross section substantially the same as that of the rocker pin 11A–11G. The wire stock is made of metal and drawn into a continuous form or shape having substantially the same cross section as that of the final rocker pin.

Figure 3A:
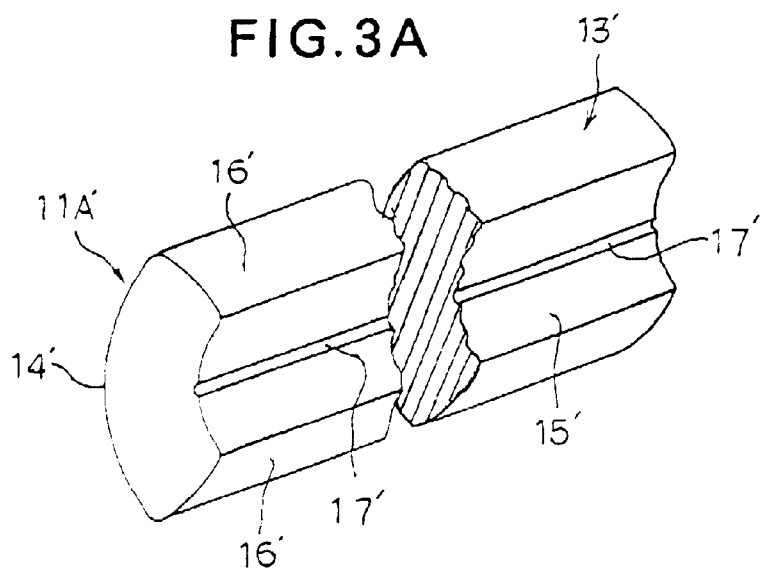
FIGS. 3A and 3B are perspective partially cut-away views showing wire stocks used for producing the rocker pins shown in FIG. 1A and FIG. 2B, respectively.
Figure 3B:
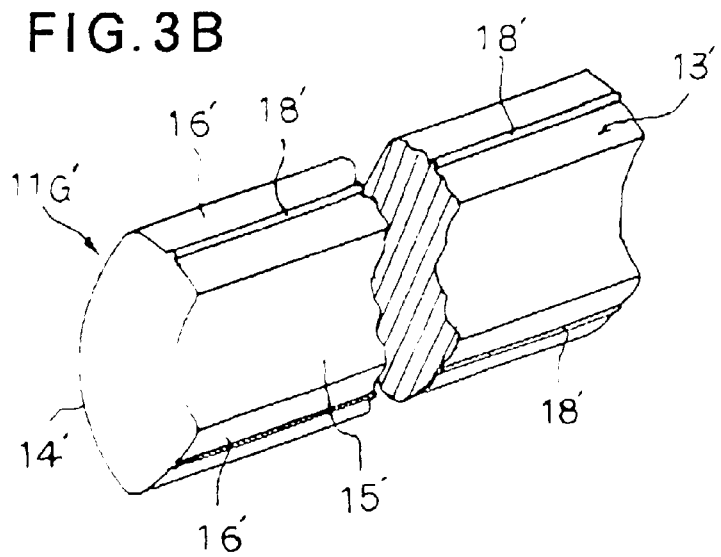

FIG. 3A shows a drawn wire stock 11A' used for producing the rocker pin 11A shown in FIG. 1A. Similarly, a drawn wire stock 11G' shown in FIG. 3B is used for producing the rocker pin 11G shown in FIG. 2B. More specifically, the wire stocks 11A' and 11G' have peripheral surfaces 13' that are profiled into substantially the same as the peripheral surfaces 13 of the rocker pins 11A and 11G. Each of the peripheral surfaces 13' of the wire stock 11A' and 11G' comprises surfaces 14', 15' and 16' respectively corresponding to the surfaces 14, 15 and 16 forming the peripheral surface 13 of the rocker pin.

The wire stock 11A' shown in FIG. 3A has an identifying means 17' composed of a groove formed in the back surface 15' and extending in the longitudinal direction of the wire stock 11A' for distinguishing the wire stock 11A' from another wire stock used for producing a rocker pin having a different thickness or a different rocker surface. The wire stock 11G' shown in FIG. 3B has an identifying means 18' composed of a ridge formed on both side surfaces 16' of the wire stock 11G' and extending in the longitudinal direction of the wire stock 11G' for distinguishing the wire stock 11G' from another wire blank used for producing a rocker pin having a different thickness or a different rocker surface. Since the wire stocks 11A' and 11G' for producing the rocker pins 11A and 11G are produced by a drawing process, the groove 17' or the ridges 18' can be readily formed during the drawing process. This eliminates the need for an additional process step carried out separately on a special ridge-forming machine or other equipment. The thus formed groove 17' or ridges 18' can be readily perceived by human eyes. Accordingly, depending on the number of the groove 17' or ridge 18', more than two kinds of wire stocks prepared for producing a corresponding number of rocker pins of different thicknesses or different rocker surfaces can be visually identified with ease. With this visual identification, the wire stocks 11A', 11G' can be stored without confusion.

Figure 4A:
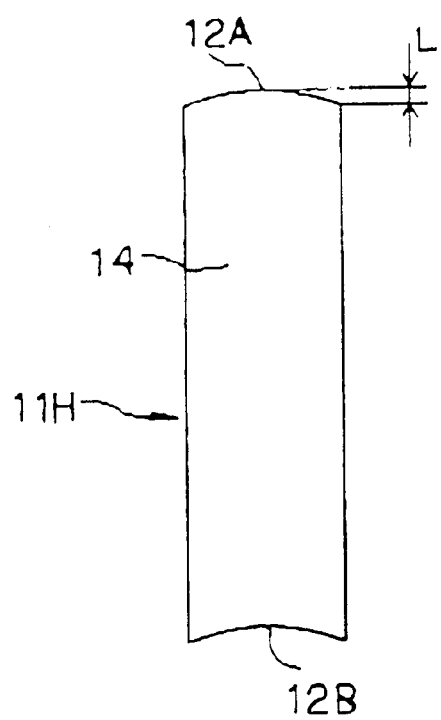
FIGS. 4A and 4B are front views showing variants of a rocker pin according to a third embodiment of the present invention.
Figure 4B:
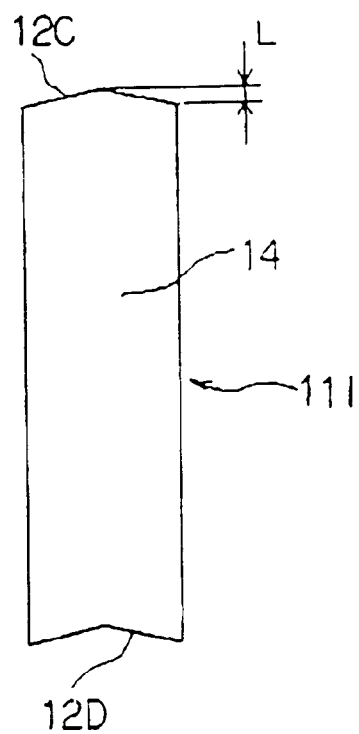

FIGS. 4A and 4B are front views showing variants of the rocker pin according to a third embodiment of the present invention when viewed from the side of the rocker surface 14. The rocker pins 11H and 11I shown in FIGS. 4A and 4B have an identifying means for distinguishing themselves from another rocker pin having a different thickness or a different rocker surface. The identifying means of the rocker pin 11H shown in FIG. 4A comprises curved or arcuate end faces 12A, 12B of the rocker pin 11H. On the other hand, the identifying means of the rocker pin 11I shown in FIG. 4B comprises angled or V-shaped end faces 12C, 12D of the rocker pin 11G. The end faces 12A–12D shown in FIGS. 4A and 4B do not lie in a plane perpendicular to a longitudinal axis of the corresponding rocker pin.

The end faces 12A–12D are formed by cutting or severing a wire stock by a cutter having a curved or angled cutting edge. More specifically, as shown in FIG. 4A, the end face 12A at one end (upper end in the figure) of the rocker pin 11H is formed by a convexly arcuate surface, and the end face 12B at the other end (lower end in the figure) is formed by a concavely arcuate surface which is complementary in shape with the convexly arcuate surface 12A. Similarly, the end face 12C at one end (upper end in FIG. 4B) of the rocker pin 11I is formed by an outwardly projecting angled or V-shaped surface 12C, and the end face 12D at the other end (lower end in FIG. 4B) is formed by a recessed V-shaped surface which is complementary in shape with the ridge-like surface 12C. The projecting or recessed end faces 12A–12D have nothing to do with the function of the rocker pins 11H, 11I, and the height L of the end faces 12A, 12C (which is equal to the depth of the end faces 12B, 12D) is preferably made as small as possible.

According to the third embodiment, the end faces 12A, 12B and 12C, 12D of the rocker pins 11H and 11I can be easily and visually identified as they are cut in an arcuate shape or in an angled shape. Accordingly, at least two kinds of rocker pins having different thicknesses or different rocker surfaces can be visually identified with ease depending on the shapes of the end faces 12A, 12B and 12C, 12D of the rocker pins 11H and 11I. This enables reliable storage of the rocker pins free from confusion, prevents the rocker pins of one kind from being mixed with rocker pins of a different kind, and further prevents incorrect combination of a longer pin and a shorter pin which may occur when they are used to form a single rocker joint.

It can readily be appreciated that a wire stock used for producing the rocker pin 11H shown in FIG. 4A or the rocker pin 11I shown in FIG. 4B has an end face which is identical to the end face 12A or 12C of the corresponding rocker pin 11H or 11I. The arcuate or angled end face of the wire stock forms an identifying means which is capable of distinguishing the wire stock from another wire stock having a different thickness or a different prospective rocker surface.

Figure 5:
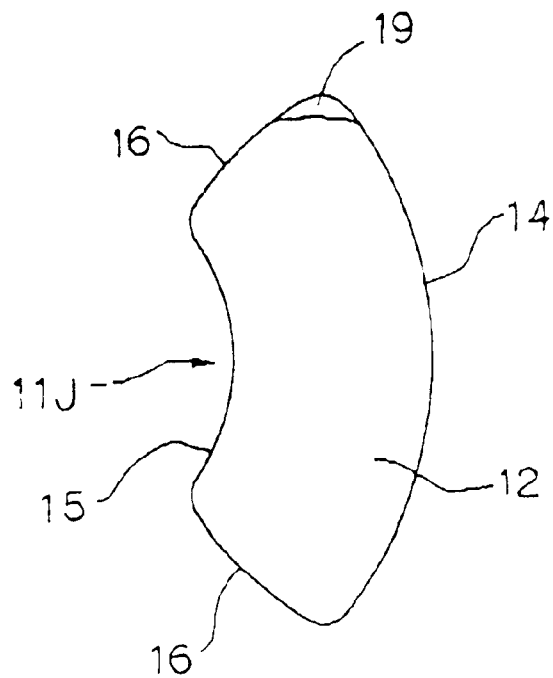
FIG. 5 is an end view of a rocker pin according to a fourth embodiment of the present invention.

FIG. 5 is an end view showing a rocker pin 11J according to a fourth embodiment of the present invention. The rocker pin 11J has an identifying means for distinguishing the rocker pin 11J from another rocker pin having a different thickness or a different rocker surface. The identifying means comprises a beveled surface 19 formed at an edge formed between a rocker surface 14 and a side surface 16 of the rocker pin 11J. More specifically, the beveled surface 19 shown in FIG. 5 is formed by chamfering an end face only at the edge formed between the rocker surface 14 and the side surface 16.

According to the fourth embodiment, the beveled surface 19 of the rocker pin 11J can be visually identified with ease. Accordingly, depending on the presence of the beveled surface 19, the rocker pin 11J can be easily and visually distinguished from another rocker pin having a different thickness or a different rocker surface. With this distinguishing feature, the rocker pin 11J can be stored reliably without confusion with another rocker pin and is able to prevent incorrect combination of a longer pin and a shorter pin which may occur when they are used in combination to form a rocker joint.

Figure 6:
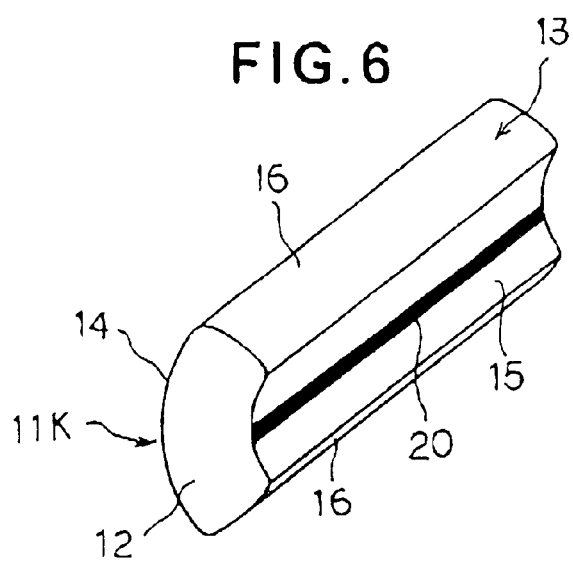
FIG. 6 is a perspective view showing a rocker pin according to a fifth embodiment of the present invention.

FIG. 6 shows a rocker pin 11K according to a fifth embodiment of the present invention. The rocker pin 11K has an identifying means 20 composed of a colored mark on a peripheral surface 13 of the rocker pin. In the illustrated embodiment, the colored mark 20 extends along the full length of a back surface 15 of the rocker pin 11k. Alternatively, the colored mark 20 may be provided on at least one side surface 16 of the rocker pin 11K. The colored mark 20 may be provided either in advance on a wire stock 11K' as at 20' (FIG. 7) from which the rocker pin 11K is produced, or alternatively after the rocker pin 11K is severed from the wire stock 11K'. It is noted that the colored mark 20 (20') may be come off after the rocker pin 11K is assembled into a chain.

According to the fifth embodiment, the colored mark 20 provided on the peripheral surface 13 of the rocker pin 11K can be visually identified with ease. Accordingly, at least two kinds of rocker pins with different thicknesses or different rocker surfaces can be easily and visually distinguished from one another depending on the presence of the colored marks provided on the peripheral surfaces of the rocker pins. This enables confusion-free storage of the rocker pins in storage, prevents rocker pins of one kind from being mixed with rocker pins of a different kind, and further prevent incorrect combination of a longer pin and a shorter pin which may occur when they are used in combination to form a single rocker joint. The effect of the colored mark 20' provided on the peripheral surface 13' of the wire stock 11K' is the same as that of mark 20 of the rocker pin 11K, and no further description thereof is necessary.

Figure 8:
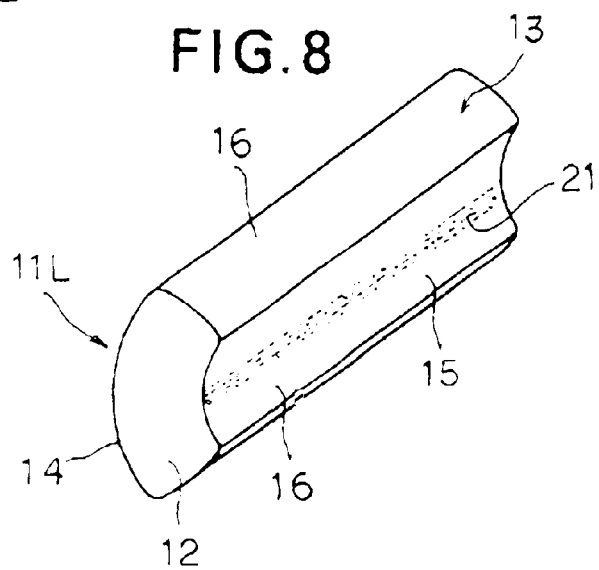
FIG. 8 is a perspective view showing a rocker pin according to a sixth embodiment of the present invention.
Figure 9:
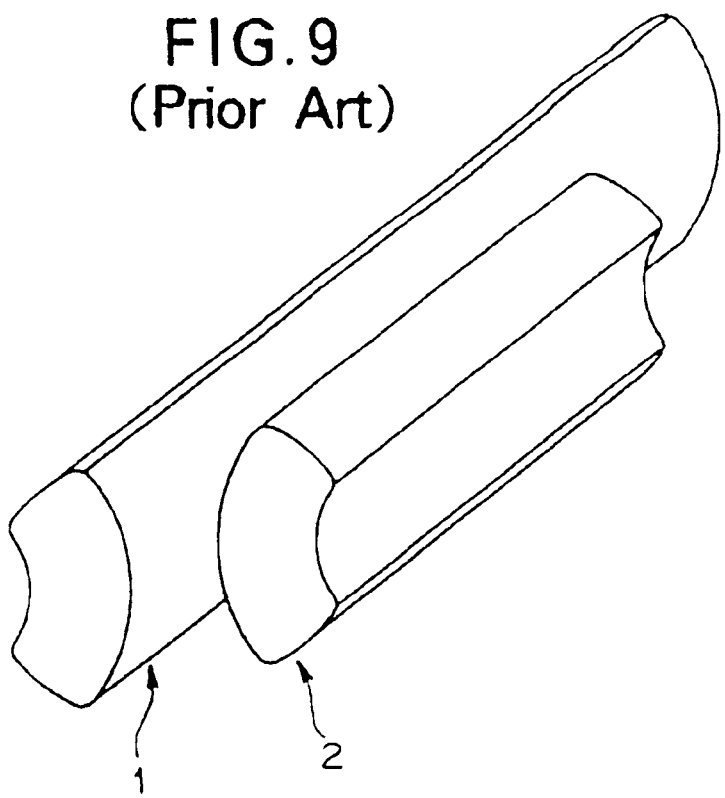
FIG. 9 is a perspective view showing conventional rocker pins composed of a longer pin and a shorter pin that are combined face to face.
Figure 10:
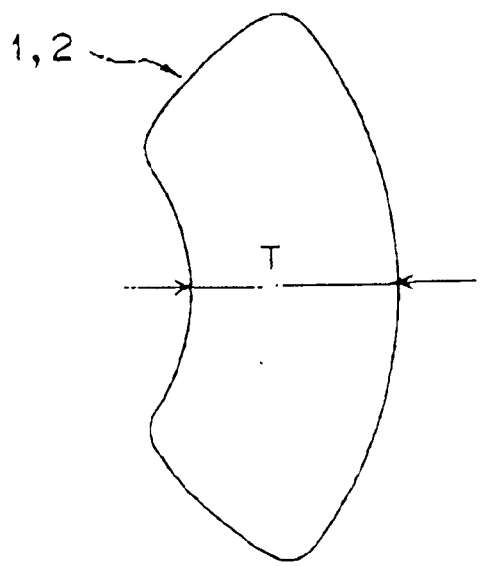
FIG. 10 is an end view of the conventional rocker pin.

FIG. 8 shows a rocker pin 11L according to a sixth embodiment of the present invention. The rocker pin 11L has an identifying means is formed by a streak 21 having a different luster from other parts of the peripheral surface 13 of the rocker pin 11L. In the illustrated embodiment, the streak 21 is provided on a back surface 15 of the rocker pin 11L and formed, for example, by changing surface roughness of a part of the peripheral surface 13 by a satin finish process or the like. In the illustrated embodiment, the streak 21 having different luster may also be provided on at least one side surface 16. The thus formed streak 21 of different luster enables discrimination between at least two kinds of rocker pins having different thicknesses or different rocker surfaces.

Figure 7:
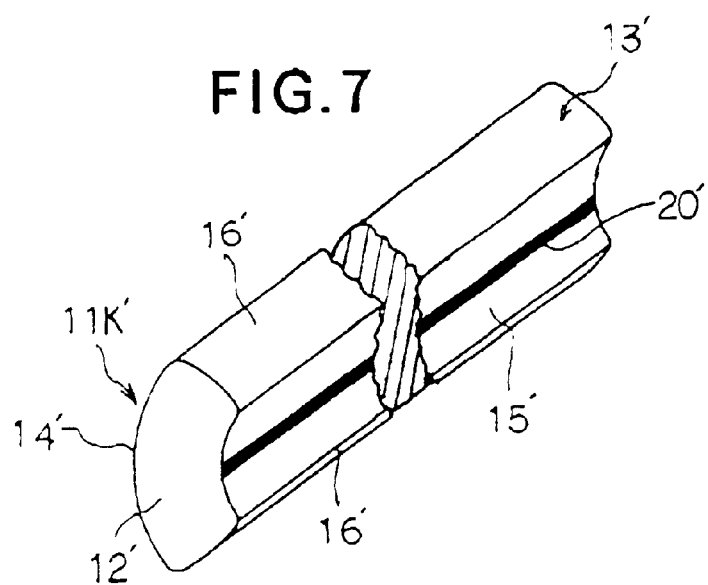
FIG. 7 is a perspective view showing a wire stock for producing the rocker pin shown in FIG. 6.

Though not shown, it can be readily understood from the embodiment shown in FIG. 6 and FIG. 7 that a wire stock used for producing the rocker pin 11L may have an identifying means formed by a streak of different luster provided on the peripheral surface along the full length of the wire stock. As in the case of the rocker pin 11L, the streak on the wire stock is formed by changing surface roughness of a portion of the peripheral surface (back surface, for example) of the wire stock by a satin finish process or the like.

While the first to sixth embodiments can be individually applied to rocker pins as described above, at least two of them can be combined as required to be applied to rocker pins. In addition, the first, second, third, fifth and sixth embodiments can be applied individually or in some combination to wire blanks for producing rocker pins.

The rocker pins or the wire stocks for producing the rocker pins according to the present invention are preferably used in silent chains or chains for use with continuously variable transmissions.

Obviously, various minor changes and modifications of the present invention are possible in the light of the above teaching. It is therefor to be understood that within the scope of the appended claims the present invention may be practiced otherwise than as specifically described.

What is claimed is:

1. A rocker pin having a given thickness and a peripheral surface including a convexly arcuate rocker surface, said rocker pin further having an identifying means for distinguishing said rocker pin from another rocker pin having a different thickness or a peripheral surface including a different rocker surface.

2. A rocker pin according to claim 1, wherein said identifying means is provided on a part of said peripheral surface other than said rocker surface.

3. A rocker pin according to claim 2, wherein said identifying means comprises at least one groove extending in the longitudinal direction of said rocker pin.

4. A rocker pin according to claim 3, wherein said groove extends along the full length of said rocker pin.

5. A rocker pin according to claim 2, wherein said identifying means comprises at least one ridge extending in the longitudinal direction of said rocker pin.

6. A rocker pin according to claim 5, wherein said ridge extends along the full length of said rocker pin.

7. A rocker pin according to claim 2, wherein said identifying means comprises at least one colored mark extending in the longitudinal direction of said rocker pin.

8. A rocker pin according to claim 7, wherein said colored mark extends along the full length of said rocker pin.

9. A rocker pin according to claim 2, wherein said identifying means comprises at least one streak having a different luster from that of the other surface and extending in the longitudinal direction of said rocker pin.

10. A rocker pin according to claim 9, wherein said streak having a different luster extends along the full length of said rocker pin.

11. A rocker pin according to claim 10, wherein said streak having a different luster comprises a satin finished surface.

12. A rocker pin according to claim 1, wherein said identifying means is provided on at least one of two end faces of said rocker pin.

13. A rocker pin according to claim 12, wherein said at least one end face comprises a surface other than a surface extending perpendicularly to a longitudinal axis of said rocker pin.

14. A rocker pin according to claim 13, wherein said at least one end face comprises an arcuate surface.

15. A rocker pin according to claim 13, wherein said at least one end face comprises a V-shaped surface.

16. A rocker pin according to claim 13, wherein each said two end faces of said rocker pin comprises a surface other than a surface extending perpendicularly to a longitudinal axis of said rocker pin and has a shape complementary to the shape of the other end face.

17. A rocker pin as set forth in claim 1, wherein said peripheral surface includes a back surface opposite to said rocker surface and a pair of side surfaces connecting said rocker surface and said back surface, and said identifying means comprises a beveled surface formed in an edge formed between said rocker surface and one of said side surfaces.

18. A continuous wire stock adapted to be severed into rocker pins of a predetermined length, said wire stock having a given thickness and a peripheral surface including a convexly arcuate prospective rocker surface, said wire stock further having an identifying means for distinguishing said wire stock from another wire stock having a different thickness or a different prospective rocker surface.

19. A wire stock according to claim 18, wherein said identifying means if provided on a part of said peripheral surface other than said prospective rocker surface.

20. A wire stock according to claim 19, wherein said identifying means comprises at least one groove extending in the longitudinal direction of said wire stock.

21. A wire stock according to claim 20, wherein said groove extends along the full length of said wire stock.

22. A wire stock according to claim 21, wherein said wire stock is a drawn wire.

23. A wire stock as set forth in claim 19, wherein said identifying means comprises at least one ridge extending in the longitudinal direction of said wire stock.

24. A wire stock according to claim 23, wherein said ridge extends along the full length of said wire stock.

25. A wire stock according to claim 24, wherein said wire stock is a drawn wire.

26. A wire stock according to claim 19, wherein said identifying means comprises at least one colored mark extending in the longitudinal direction of said wire stock.

27. A wire stock according to claim 26, wherein said colored mark extends along the full length of said wire stock.

28. A wire stock according to claim 19, wherein said identifying means comprises at least one streak having a different luster from that of the other surface and extending in the longitudinal direction of said wire stock.

29. A wire stock according to claim 28, wherein said streak having a different luster extends along the full length of said wire stock.

30. A wire stock according to claim 27, wherein said streak having a different luster comprises a satin finished surface.

31. A wire stock according to claim 18, wherein said identifying means is provided on at least one of two end faces of said wire stock.

32. A wire stock according to claim 31, wherein said at least one end face comprises a surface other than a surface extending perpendicularly to a longitudinal axis of said wire stock.

33. A wire stock according to claim 32, wherein said at least one end face comprises a curved surface.

34. A wire stock according to claim 32, wherein said at least one end face comprises a V-shaped surface.

* * * * *

UNITED STATES PATENT AND TRADEMARK OFFICE
CERTIFICATE OF CORRECTION

PATENT NO.    : 6,393,819 B1
DATED         : May 28, 2002
INVENTOR(S)   : Kazumasa Matsuno et al.

It is certified that error appears in the above-identified patent and that said Letters Patent is hereby corrected as shown below:

<u>Title page,</u>
Item [57], ABSTRACT,
Line 12, a comma "," should be inserted after the first occurrence of pin;
Line 12, the comma "," should be deleted after the second occurrence of pin;

<u>Column 1,</u>
Line 66, "a" should be deleted;

<u>Column 2,</u>
Line 52, the sentence reading "The identifying means is provided on the peripheral surface other than the prospective rocker surface and a part of extends in the longitudinal direction of the wire stock" should read -- The identifying means is provided on a part of the peripheral surface other than the prospective rocker surface and extends in the longitudinal direction of the wire stock --.

Signed and Sealed this

Twenty-eighth Day of January, 2003

JAMES E. ROGAN
*Director of the United States Patent and Trademark Office*